United States Patent
Kirmaier et al.

(10) Patent No.: US 12,351,151 B2
(45) Date of Patent: Jul. 8, 2025

(54) TRAILER BRAKE CONTROL SYSTEM

(71) Applicant: AGCO International GmbH, Neuhausen (CH)

(72) Inventors: Philipp Kirmaier, Marktoberdorf (DE); Simon Streiber, Marktoberdorf (DE); Manuel Abel, Marktoberdorf (DE); Josef Ammann, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 148 days.

(21) Appl. No.: 18/258,591

(22) PCT Filed: Dec. 3, 2021

(86) PCT No.: PCT/IB2021/061300
§ 371 (c)(1),
(2) Date: Jun. 21, 2023

(87) PCT Pub. No.: WO2022/157571
PCT Pub. Date: Jul. 28, 2022

(65) Prior Publication Data
US 2024/0042975 A1 Feb. 8, 2024

(30) Foreign Application Priority Data

Jan. 19, 2021 (GB) ........................ 2100651
Aug. 9, 2021 (GB) ........................ 2111426

(51) Int. Cl.
*B60T 8/17* (2006.01)
*B60Q 9/00* (2006.01)
(Continued)

(52) U.S. Cl.
CPC ............. *B60T 8/1708* (2013.01); *B60Q 9/00* (2013.01); *B60T 7/20* (2013.01); *B60T 8/1701* (2013.01);
(Continued)

(58) Field of Classification Search
CPC . B60Q 9/00; B60T 13/00; B60T 13/08; B60T 13/12; B60T 13/26; B60T 13/263;
(Continued)

(56) References Cited

U.S. PATENT DOCUMENTS 4,771,838 A * 9/1988 Ketcham ............... B62D 13/00
180/6.62
5,149,121 A 9/1992 Hafner
(Continued)

FOREIGN PATENT DOCUMENTS

DE 102012101501 A1 8/2013
DE 102018121439 A1 3/2020
(Continued)

OTHER PUBLICATIONS

European Patent Office, International Search Report related to International Patent Application No. PCT/IB2021/061300, mail date Mar. 4, 2022, 13 pages.

*Primary Examiner* — Carl C Staubach

(57) ABSTRACT

Systems and methods are provided for controlling operation of a trailer brake system associated with an agricultural vehicle-trailer combination. Using a driver deceleration demand a pressure level and/or duration for a preliminary pressure peak to be provided in one or more fluid lines of the trailer brake system is determined. A trailer brake signal is generated for controlling the trailer brake system in accordance with the preliminary pressure peak.

11 Claims, 7 Drawing Sheets

(51) Int. Cl.

| | | |
|---|---|---|
| *B60T 7/20* | (2006.01) | |
| *B60T 8/171* | (2006.01) | |
| *B60T 8/172* | (2006.01) | |
| *B60T 8/1755* | (2006.01) | |
| *B60T 8/18* | (2006.01) | |
| *B60T 8/24* | (2006.01) | |
| *B60T 8/32* | (2006.01) | |
| *B60T 13/12* | (2006.01) | |
| *B60T 13/26* | (2006.01) | |
| *B60T 13/66* | (2006.01) | |
| *B60T 13/68* | (2006.01) | |
| *B60T 17/22* | (2006.01) | |

(52) U.S. Cl.
CPC ............. *B60T 8/171* (2013.01); *B60T 8/172* (2013.01); *B60T 8/1755* (2013.01); *B60T 8/17551* (2013.01); *B60T 8/18* (2013.01); *B60T 8/245* (2013.01); *B60T 8/248* (2013.01); *B60T 8/323* (2013.01); *B60T 13/12* (2013.01); *B60T 13/26* (2013.01); *B60T 13/263* (2013.01); *B60T 13/66* (2013.01); *B60T 13/662* (2013.01); *B60T 13/68* (2013.01); *B60T 17/22* (2013.01); *B60T 2201/04* (2013.01); *B60T 2210/30* (2013.01); *B60T 2250/00* (2013.01); *B60T 2250/02* (2013.01); *B60T 2250/03* (2013.01); *B60Y 2200/147* (2013.01); *B60Y 2200/22* (2013.01); *B60Y 2200/221* (2013.01)

(58) Field of Classification Search
CPC ........ B60T 13/66; B60T 13/662; B60T 13/68; B60T 17/22; B60T 2201/04; B60T 2210/30; B60T 2250/00; B60T 2250/02; B60T 2250/03; B60T 7/20; B60T 8/00; B60T 8/1701; B60T 8/1708; B60T 8/171; B60T 8/172; B60T 8/1755; B60T 8/17551; B60T 8/18; B60T 8/245; B60T 8/248; B60T 8/323; B60Y 2200/147; B60Y 2200/22; B60Y 2200/221
See application file for complete search history.

(56) References Cited

U.S. PATENT DOCUMENTS

| | | | |
|---|---|---|---|
| 5,330,020 A * | 7/1994 | Ketcham | B60T 7/20 |
| | | | 180/14.2 |
| 5,522,649 A | 6/1996 | Stender et al. | |
| 5,615,931 A | 4/1997 | Stumpe et al. | |
| 10,029,660 B2 * | 7/2018 | Buchner | B60T 13/683 |
| 10,549,742 B2 * | 2/2020 | Boulivan | B60T 7/20 |
| 10,875,497 B2 * | 12/2020 | Srnec | B60R 25/08 |
| 11,932,225 B1 * | 3/2024 | Kirmaier | B60T 8/17551 |
| 11,964,647 B2 * | 4/2024 | Kirmaier | B60T 8/1755 |
| 12,145,557 B1 * | 11/2024 | Bailey | B60T 7/20 |
| 12,263,823 B2 * | 4/2025 | Kasper | B60T 8/1708 |
| 2004/0051374 A1 * | 3/2004 | Tobler | B60T 13/08 |
| | | | 303/123 |
| 2006/0033308 A1 * | 2/2006 | Waldbauer | B60T 8/241 |
| | | | 280/455.1 |
| 2018/0304871 A1 * | 10/2018 | Eckert | B60T 8/17554 |
| 2020/0001841 A1 * | 1/2020 | Green | B62D 53/005 |
| 2020/0040956 A1 | 2/2020 | Cremona et al. | |
| 2020/0094738 A1 * | 3/2020 | Lane | B60T 7/20 |
| 2021/0188279 A1 * | 6/2021 | Glavinic | B60W 10/184 |
| 2024/0042973 A1 * | 2/2024 | Kirmaier | B60T 13/66 |
| 2024/0042976 A1 * | 2/2024 | Kirmaier | B60T 13/26 |
| 2024/0059263 A1 * | 2/2024 | Kirmaier | B60T 13/26 |
| 2024/0092324 A1 * | 3/2024 | Kirmaier | B60Q 9/00 |
| 2024/0270217 A1 * | 8/2024 | Kirmaier | B60T 13/66 |

FOREIGN PATENT DOCUMENTS

| | | |
|---|---|---|
| EP | 3569458 A1 | 11/2019 |
| GB | 2566492 A | 3/2019 |
| SE | 539265 C2 | 6/2017 |

* cited by examiner $F_C = F_{TRC} - (F_{IN} + F_H + F_{AR} + F_{R,RA} + F_{R,FA})$

TRAILER BRAKE CONTROL SYSTEM

CROSS-REFERENCE TO RELATED APPLICATIONS

This application is a national phase entry under 35 U.S.C. § 371 of International Patent Application PCT/IB2021/061300, filed Dec. 3, 2021, designating the United States of America and published in English as International Patent Publication WO 2022/157571 A1 on Jul. 28, 2022, which claims the benefit of the filing date of U.K. Patent Application 2100651.5, filed Jan. 19, 2021, and U. K. Patent Application 2111426.9, filed Aug. 9, 2021, the entire disclosures of each of which are incorporated herein by reference.

FIELD OF THE INVENTION

The invention relates to a control system for a vehicle trailer brake, especially for use in agricultural vehicles such as tractors.

BACKGROUND

Many vehicles are provided with attached trailers for the transportation of goods and materials. For large-scale use such trailers may be provided with trailer braking systems to allow for safe control of the trailer, and to prevent jack-knifing or skidding of the trailer when braking.

Both jack-knifing or skidding occurs when the force applied by the trailer to the towing vehicle, also referred to as coupling force, exceeds a certain level. The coupling force is mainly generated by the trailer weight and the inertia during breaking A first effect of an excessive coupling force is that the towing vehicle is excessively pushed (later referred to as push condition) and the vehicles track guiding forces are overcome. This results in a yaw moment/movement about the vertical vehicle axis of the towing vehicle which cannot be bear by the wheel-ground contact. The towing vehicle then starts to skid.

A further effect may be that in case of drawbar trailer wherein the front wheels are pivotably attached to the trailer chassis the drawbar may be unintentionally be pivoted relative to the chassis by the coupling force so that the trailer behaves like the jack knife and swerve out of its track.

These effect is especially appearing when the vehicle is decelerated without the driver activating the vehicle service brake system and occurs when downshifting a continuously variable transmission or using a retarders in trucks.

It is well known that these effects can be reduced by activating the brakes of the trailer depending on the coupling force to stabilize the vehicle combination. But the brake activation must be appropriately applied to reduce the coupling force but also to avoid that excessive braking destabilizes the vehicle combination as the combination is stretched excessively which would also apply a yaw moment to towing vehicle.

With the introduction of electronic braking systems wherein the brake force can be controlled independent of the drivers input systems have been developed especially for trucks.

Therefore, trailers used in combination with trucks are mainly using information of on-board assistant systems like electronic trailer suspension, ABS, ESP, ASR to determine the coupling force. Especially the trailer suspension helps to determine the weight of the trailer, other of these sensors help to fine tune the brake actuation by determining wheel speeds and accelerations.

Focusing now on agricultural vehicle combinations, mainly tractors and agricultural trailers, it must be considered that brake systems described above are not as common as for trucks. Especially the trailers are rarely equipped with on-board assistant systems like electronic trailer suspension, ABS, ESP, ASR and therefore the coupling force is difficult to determine.

Therefore it is a main target of the invention to provide a method to control the trailer brake force independent of the knowledge of trailer parameters, especially the weight of the trailer. Furthermore, the method shall only include parameters and components which are already installed on the tractor to reduce keep costs down and reduce complexity.

Furthermore, tractors, and especially tractors with Continuously Variable Transmission (CVT) such as hydrostatic-mechanical split type transmissions, are provided with different operating modes especially to determine the drivers demand with regard to acceleration and deceleration of the vehicle, including a driver lever mode wherein the acceleration or deceleration of the vehicle (or a combination) is entered by driver by pushing or pulling the lever and a foot pedal mode wherein the vehicle speed is set by depressing the foot pedal.

It is a further target of the invention to include the different operation modes into the method to provide an improved trailer brake control.

It is an objective of the invention to provide a trailer brake control system which overcomes the aforementioned problems to determine the braking force applied to a trailer.

SUMMARY OF THE INVENTION

According to an aspect of the invention there is provided a control system for controlling operation of a trailer brake system associated with an agricultural vehicle-trailer combination, the control system comprising a vehicle control unit, and being configured to: determine a driver deceleration demand; determine a pressure level and/or duration for a preliminary pressure peak to be provided in one or more fluid lines of the trailer brake system in dependence on the driver deceleration demand; generate a trailer brake signal for controlling the trailer brake system in accordance with the preliminary pressure peak; and forward the trailer brake signal to the trailer brake control system to control operation thereof.

A further aspect of the invention provides a braking system comprising and/or being controllable by a control system of the preceding aspect of the invention.

A further aspect of the invention provides an agricultural vehicle coupleable to a trailer to form a vehicle-trailer combination, and comprising and/or being controllable by a control system as described herein.

A further aspect of the invention provides a method of controlling operation of a trailer brake system associated with an agricultural vehicle-trailer combination, comprising: determining a driver deceleration demand; determining a pressure level and/or duration for a preliminary pressure peak to be provided in one or more fluid lines of the trailer brake system in dependence on the driver deceleration demand; and controlling the trailer brake system in accordance with the determined preliminary pressure peak.

Further advantageous embodiments and features are described herein with reference to the following description and/or the accompanying claims.

BRIEF DESCRIPTION OF THE DRAWINGS

The invention will now be described, by way of example only, with reference to the accompanying drawings in which.

DETAILED DESCRIPTION

Figure 1:
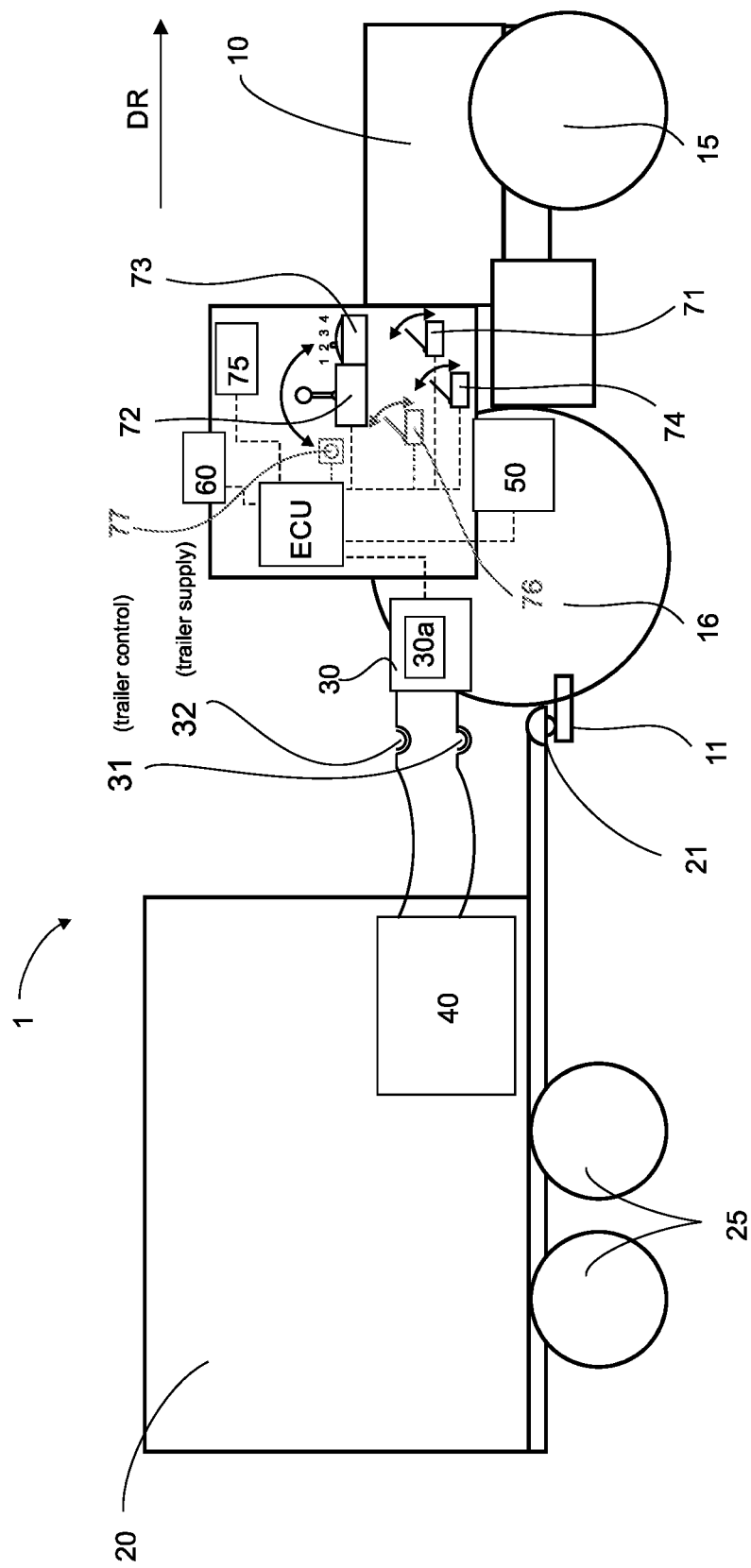
FIG. 1 schematically represents side view of a vehicle combination using the present invention.

FIG. 1 shows a vehicle combination 1 comprising a tractor 10 and a trailer 20 which is attached to the tractor hitch system 11 of the tractor 10 via a trailer drawbar 21. The tractor 10 comprises front and rear wheels 5, 6 which are braked by a service brake system and a park brake systems which is not described hereinafter in detail as well known in the art. To brake the trailer, a trailer brake system 30 mainly including a trailer brake valve 30a and or further valve arrangements and is provided to forward a pneumatic or hydraulic brake signal to the trailer via the standardized trailer control coupling 31. The further trailer supply coupling 32 is provided for air or oil supply to the trailer brakes. Both couplings 31, 32 are used to connected at least the trailer brake system 30 to a brake system 40 of the trailer. The brake system 40 serves to actuate the brakes of the wheels 25 of the trailer 20.

The trailer brake actuation pressure can be generated by trailer brake system 30 e.g. when the driver activates the service brake system with the brake pedal (not shown) and/or the park brake system (with the handbrake lever) of the tractor 10 so that brake demand is directly forwarded by pressurized fluids such as air or oil to the trailer brake system 30. Alternatively a trailer brake actuation pressure may be generated independent of the direct driver activation but in response to a trailer brake signal TBS coming from an electronic vehicle control unit ECU, which is also referred to as electronic trailer braking. This type of brake signal generation is focused in the following invention.

To provide a control system for the trailer brake of the trailer 20, the tractor 10 the electronic vehicle control unit ECU receives parameter and/or sends control signals to various components of the tractor 10, such as:

A transmission 50 to adjust the vehicle speed v or the vehicle acceleration a depending on the demand set values of the driver and receive parameters such as the output rotational speed and rotation direction of the output shaft of the transmission and the system pressure of the hydraulic branch of the CVT (continuous variable) transmission 100.

A gyroscope 60 to determine vehicle speed v or the vehicle acceleration and/or inclination α. The gyroscope may be part of a satellite based navigation system.

HMI components, such as:

a speed foot paddle 71 and/or a drive lever 72 to receive the drivers input for vehicle speed or a vehicle acceleration.

an acceleration rate input 73 to adjust the degree of acceleration/deceleration when moving the drive lever 72

A clutch pedal 74 to disconnect the transmission 50 from the prime mover such as an internal combustion engine.

A HMI terminal 75 to enable the driver to input or display various parameters in connection with the vehicle 10, the trailer 10 or the vehicle combination 1.

A service brake foot paddle 76 to receive the drivers input for the activation of the service brake of the tractor.

A park brake switch or a park brake lever 77 to receive the drivers input for the service brake for the activation of the service brake of the tractor.

To summarise, the electronic vehicle control unit ECU has the major task to provide a processing method which includes:

receiving relevant parameters of the vehicle 10;

determining a set value for the trailer brake signal TBS according the method described hereinafter; and forwarding the trailer brake signal TBS to the trailer brake control system 30 to activate the trailer brakes.

In the shown embodiment, the trailer brake signal TBS is represented by a pressure demand to control a pneumatic trailer brake system 30. Alternatively, the trailer brake signal TBS may be provided to control a hydraulic brake system and the trailer brake valve 30a is also hydraulically operated. More alternatively, the trailer brake signal TBS may be forwarded to the trailer brake system by any other means such as an electronic signal if brake-by-wire systems are installed on the trailer.

The method for controlling the trailer brake control system 30 will now be described with reference to the flowchart of FIGS. 2, 3, 4, 5.

The method can be implemented on the electronic vehicle control unit ECU or may alternatively be part of the trailer brake control system 30 when equipped with a respective control unit and interface to receive the above mentioned parameters.

According the ongoing method, the electronic vehicle control unit ECU iteratively generates a trailer brake signal TBS to be forwarded to the trailer valve 30a. The trailer brake signal TBS receives different values which are described hereinafter.

Figure 4:
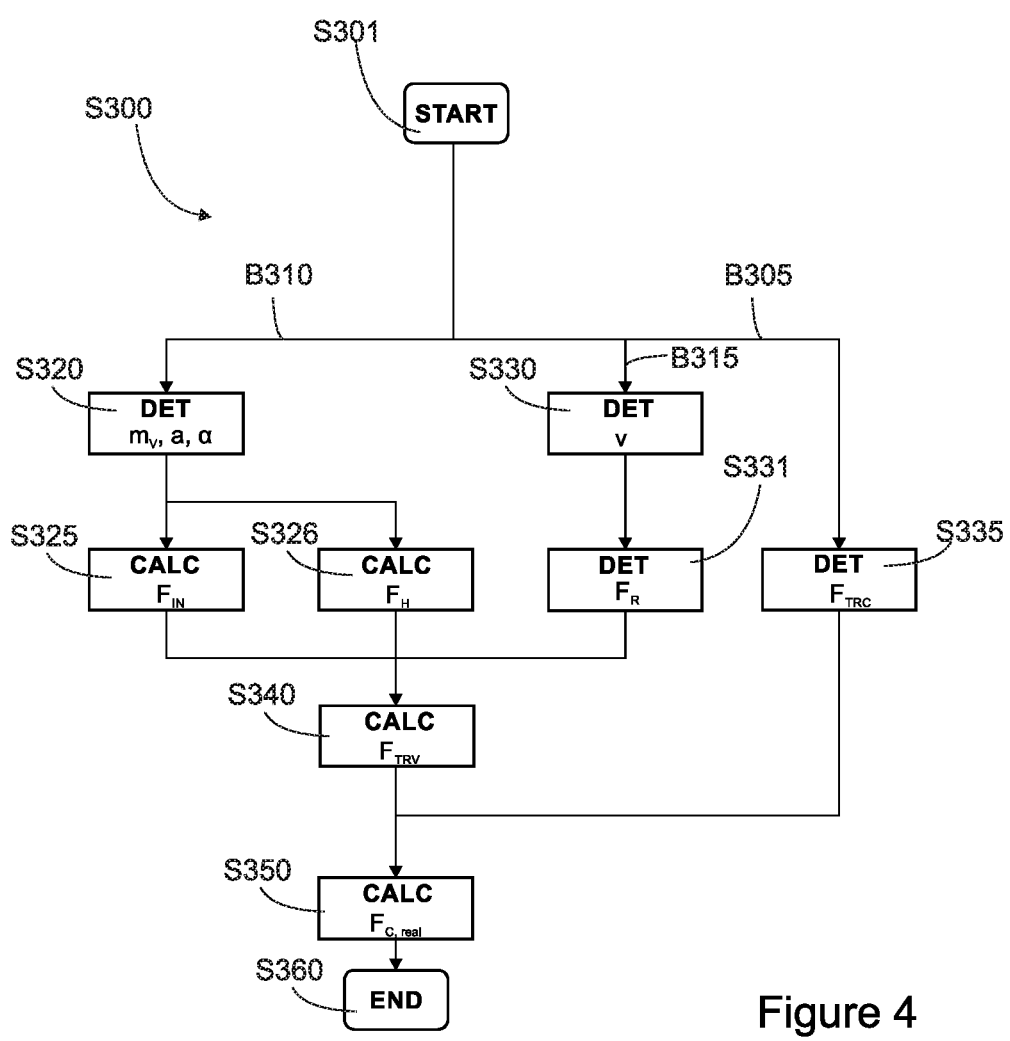
Figure 5:
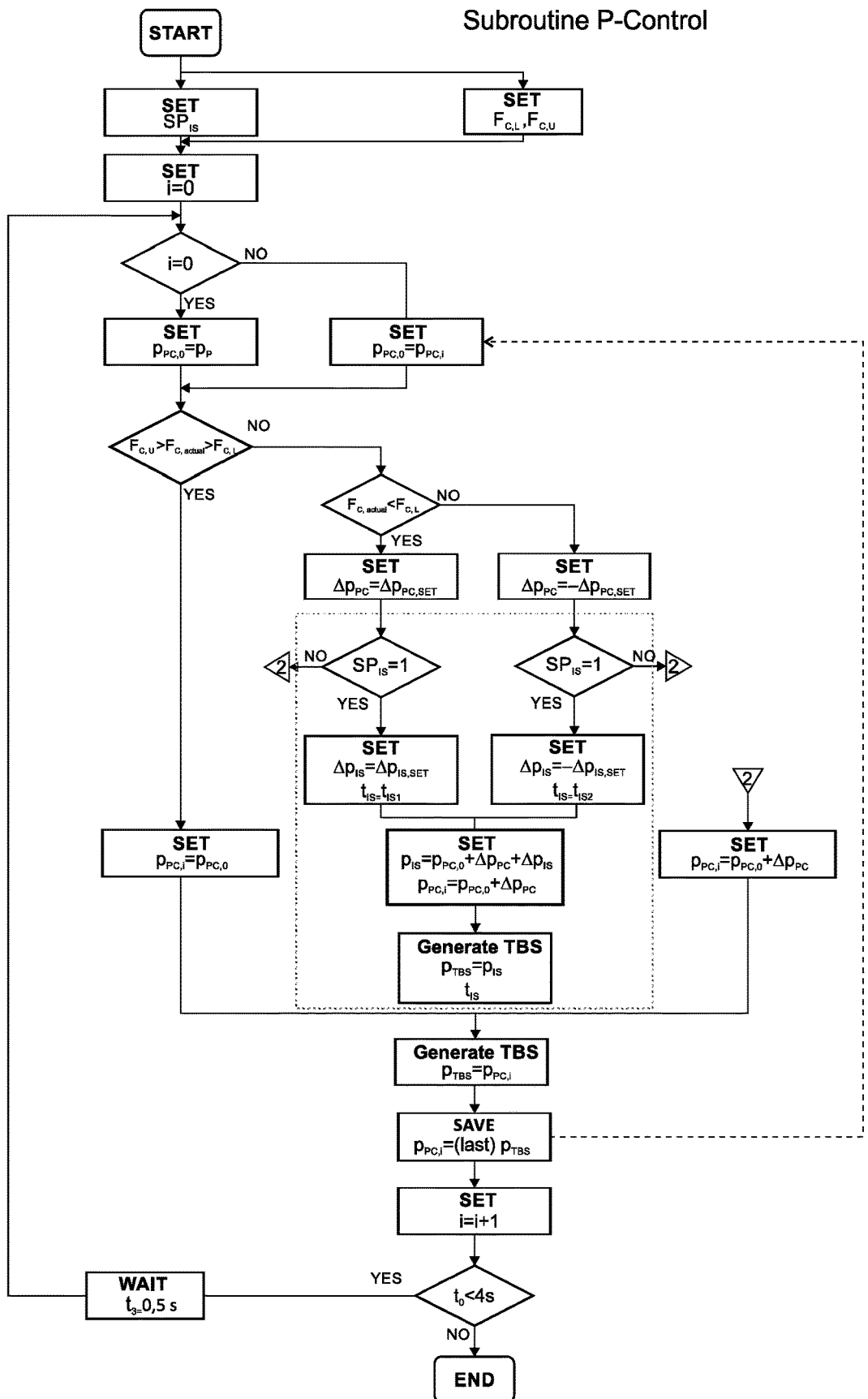

The electronic vehicle control unit ECU executes the method M100 as depicted in FIG. 1. For clarity reasons, the main method M100 is depicted in several sub processes wherein FIG. 2 shows the main method M100 which includes sub process S200 as shown in FIG. 3, sub process S300 as shown in FIG. 4 and sub process S400 as shown in FIG. 5.

Figure 2:
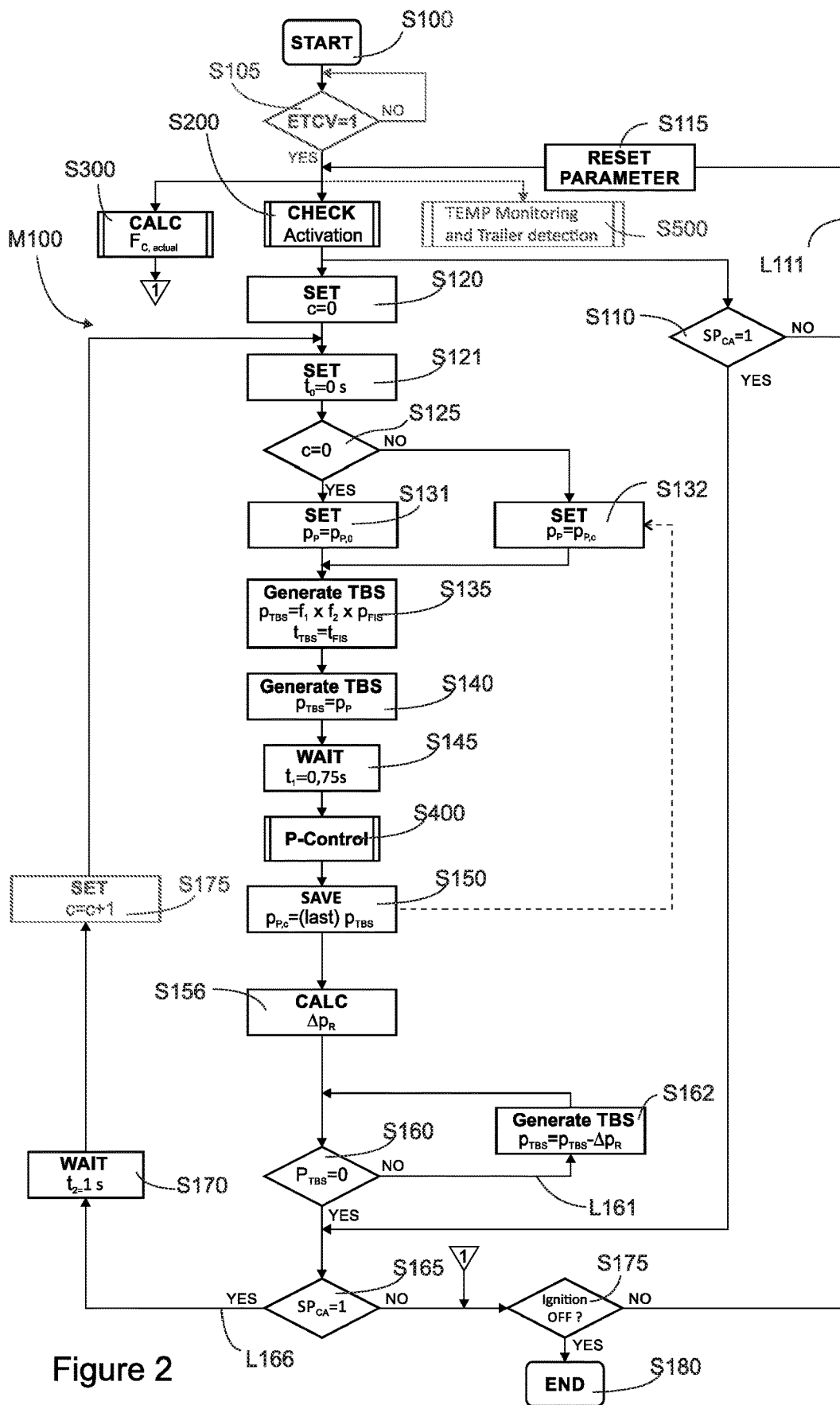
FIGS. 2, 3, 4, 5 are flow charts showing the principal process steps of a method embodying the invention, FIG. 6a schematically represents side view of a vehicle combination and the forces applied using the present invention.

Referring now to FIG. 2, the electronic vehicle control unit ECU is initializing the method with step S100. The initialization may be triggered if the ignition is ON and the electronic vehicle control unit ECU is energized. Alternatively, the initialization may be triggered if the electronic vehicle control unit ECU detect that a trailer 20 is attached to the vehicle 10. This may be determined if the standardized current supply connector (which supplies current to the trailer 20 and/or activates lights or the turn indicator of the trailer 20) is connected to the receiving connector on vehicle 10.

After initialization, the methods checks with step S105 if the electronic trailer brake function is activated (with ETCV=1) and then branches off to subroutines in step S200, S300. The electronic trailer brake may be activated when ignition is ON and the electronic vehicle control unit ECU is energized or may be activated/deactivated by the driver input initially. Alternatively electronic trailer brake may temporarily be aborted by actuation of the service or park brake. Deactivation of the trailer brake function results in the parameter ETCV=0.

Figure 3:
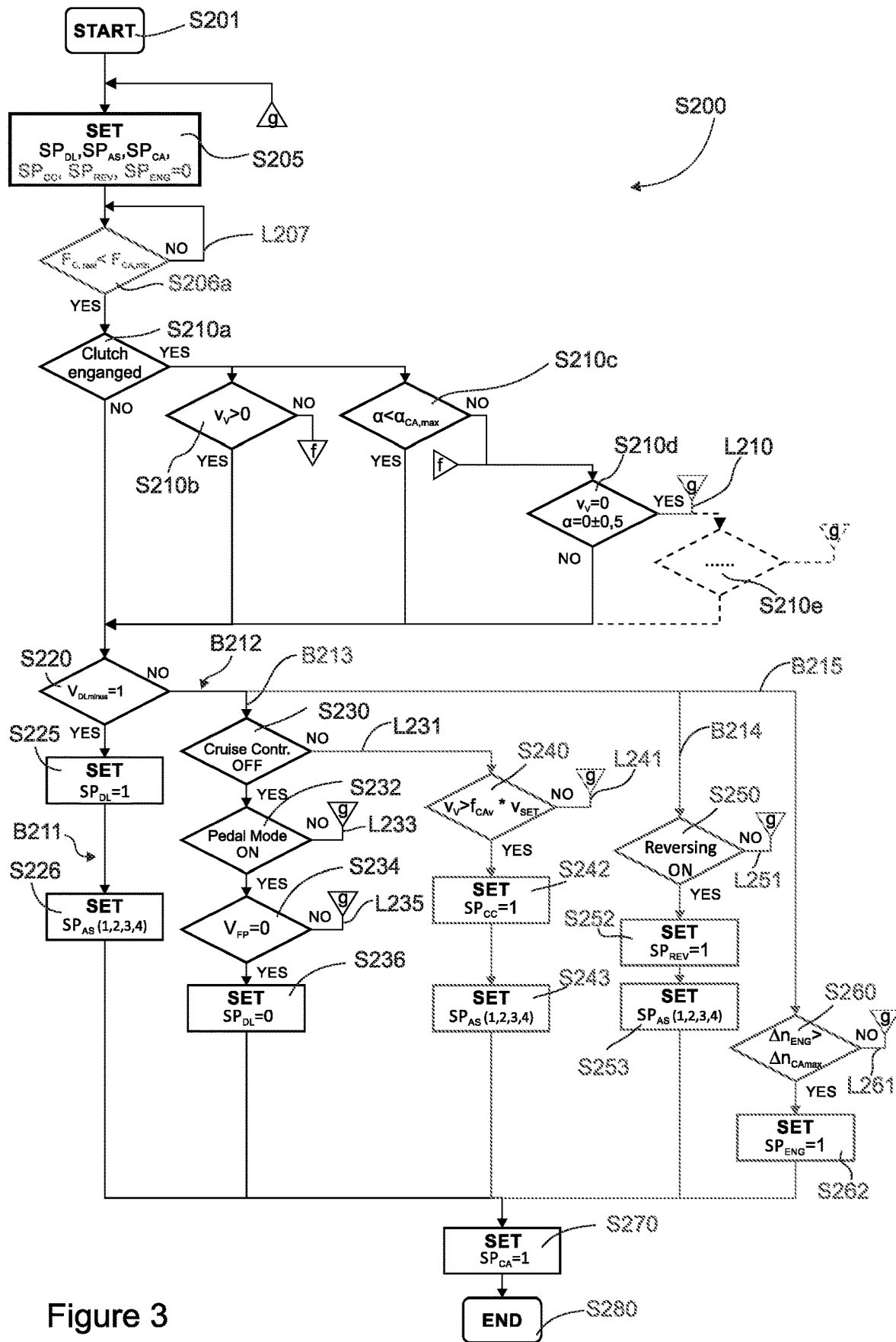

In subroutine A200 several pre-conditions and activation parameters for further proceeding in method M100 are checked which are depicted in FIG. 3. The term pre-condition means that these conditions must be met to generally enable activation of the electronic trailer braking while activation parameters serve to determine what event causes deceleration and additionally may establish the degree of deceleration and to adapt the trailer brake signal accordingly.

After starting at S201, step S205 (re)sets status parameters $SP_{DL}$, $SP_{AS}$, $SP_{CA}$, $SP_{CC}$, $SP_{REV}$, $SP_{ENG}$, to zero. The status parameter are explained later on.

Generally the activation checks pre-conditions which allow the electronic trailer brake function is to be activated and whether and how the vehicle is decelerated, especially but not exclusively if this is done by using the acceleration foot paddle 71 or the drive lever 72. Furthermore, this step serves to determine the driver's demand regarding the degree of deceleration, also referred to as the driver deceleration demand DD.

These pre-conditions try to avoid unsafe vehicle caused by electronic trailer braking but also serve to avoid unmeant or unnecessary electronic trailer braking resulting in that the driver may feel uncomfortable when the assistance system activates trailer brake when it is apparently unnecessary. In other words, electronic trailer braking shall be prohibited when not needed.

Step S206a checks a first pre-condition by determining if the coupling force $F_{C, real}$ (see subroutine S300) is below a set value of $F_{CA,min}$, say −3500 N (in a range of negative sign) to ensure that the trailer 20 significantly pushes the tractor 10 (push condition). There are conditions, in which higher coupling force $F_{C, real}$ (smaller when seen with negative sign) may occur but electronic trailer brake should not be activated. E.g. this condition may occur if an implement is initially coupled to the tractor or if potholes are passed. If NO, the process returns prior to step S206a with loop L207.

Step S206a must be seen as a pre-condition which, when once met, enables the coupling force $F_{C, real}$ to take any value in the further processing, even being above $F_{CA,min}$ without aborting the process or the activation.

In the next steps, a series of further pre-conditions are checked:

Step S210a checks if the driveline clutch is activated. This provision is necessary when e.g. the operator intends to let the vehicle combination roll towards a crossing. The method should not be executed further as this results in that the CVT is drivingly disconnected from the wheels so that the determination of the coupling force based on CVT parameters is not possible. So if YES step S210b is proceeded to check next pre-condition while NO would be followed by step S220 explained later on.

The step S210a is provided subsequent to step S206a (which requires the detection of a coupling force when clutch is disengaged) to make sure that the activation is aborted whenever clutch is subsequently disengaged.

Next, steps S210b and S210c proceed to check two pre-conditions in an OR relationship which means that one of both is met. According step S210b the vehicle speed shall be $v_V$>0 kph (or alternatively $v_{SET}$>0 kph) or according step S210c the tractor 10 drives uphill with $\alpha<\alpha_{CA,max}$, of say −4° as a negative sign is downhill inclination, as both conditions are known for resulting in push condition. Alternatively, step S210b may consider a minimum value for the vehicle speed $v_V$ or vehicle speed set point $v_{SET}$ to be exceeded to avoid electronic trailer activation at low speeds where push condition is less critical. When one of these pre-condition is met, the method proceeds to step S220 explained later on. Otherwise, next pre-condition is checked in step S210d.

Step S210d is provided to avoid that electronic trailer braking is activated in stand still on plane ground (no or small slope). Therefore step S210d checks if $v_V$=0 kph (or alternatively $v_{SET}$>0 kph) and the slope is close to zero. This is especially important when a CVT is installed having so called "active standstill" control: If the vehicle is decelerated by speed foot paddle 71 or a drive lever 72 to standstill (0 kph) without service or park brake being activated, the CVT is operated in "active standstill". In this condition, the electronic vehicle control unit ECU provides control of the transmission to maintain the output speed of the transmission (and thereby the wheels) at zero rpm to compensate unmeant movement resulting from idle oil flow in the hydraulic branch of the CVT (as described in applicant's published patent applications EP 1 990 230 and EP 2 935 948). This means, that the hydraulic units are permanently adjust which may result in that a coupling force may be detected which should not result in trailer brake activation.

So to summarize, the steps S210b, S210c and S210d serve to enable electronic trailer braking when driving on even ground, uphill or downhill and when the tractor stands still on downhill as push condition may be present. But when standing uphill or on even ground, activation shall be prohibited as these conditions will not result in push condition.

When step S210d results in YES, the loop L210 returns prior to step 210 with status parameters $SP_{CA}$ remaining zero.

Alternatively further pre-conditions may be checked indicated by step S210d and may result in further processing of step S220 or a loop which returns prior to step 210 with status parameters $SP_{CA}$ remaining zero.

Further pre-conditions not shown in FIG. 3 may be:
CVT switch to "neutral": In this operating condition activated via HMI terminal, the CVT is brought into a condition similar to the clutch engaged described in step S210a with the CVT drivingly disconnected from the wheels so that the determination of the coupling force based on CVT parameters is not possible.

Condition "EU brake test": This condition is activated by the driver to inhibit actuation of the service brake function of the trailer brakes when the park brakes on the tractor are applied in standstill. This test procedure must be regularly done due to EU regulations to check if the park brake system of the tractor (energised by spring load) is capable to sufficiently keep the vehicle combination in standstill (when shut down) if the trailer brakes may fail due to leakage/malfunction in the trailer brake system. The electronic trailer brake must be permanently deactivated during the test without unmeant trailer brake actuation.

Electronic trailer brake function activated: Similar to step S105 (in FIG. 3) the electronic trailer brake function must be activated (with ETCV=1).

Maximum speed requirement: If the vehicle speed exceeds 25 kph. Above a certain vehicle speed, the wheels tend more to lock when braked. Especially at high speeds, this may cause dangerous situations so the method is prohibited above a certain vehicle speed The maximum vehicle speed value may be determined depending on the driver's choice or may also set dependent on trailer parameters. E.g. If the trailer is equipped with ABS system, the limitation may not be necessary.

With the following steps, the method detects in which way the operator inputs a demand to decelerate the vehicle (without actuating service or park brake). This is done in activation branches B211, B212, B213, B214 and B215. Activation branch B211 commences with step S220, in which the activation via the drive lever 72 is checked. If the operator intends to decelerate the vehicle, he pushes back the drive lever 72 in the opposite direction as indicated with arrow DR. Thereby, the demand value $V_{DL}$ which is forwarded to the ECU is in a minus range and the parameter $V_{DLminus}$ is set to 1. If the drive lever 72 is released, vehicle speed remains constant so that parameter $V_{DLminus}$ is set to 0.

If parameter $V_{DLminus}$ is set to 1, this leads to step S225 in which the status parameter $SP_{DL}$ is set to 1 indicating that the deceleration is inputted via drive lever 72. Next step is step S226 in which the value of the acceleration rate input 73 is determined. The acceleration rate input 73 serves to determine the operators input regarding the driver deceleration demand DD on response of the operator's input and therefore offers four set points: level I, II, III, IV. If the operator adjusts the acceleration rate input 73 to level I in which the status parameter $SP_{AS}$ would receive the value 1, the driving speed of the vehicle decreases at slowest so that the deceleration is low and smooth. At Level IV in which the status parameter $SP_{AS}$ would receive the value 4 the driving speed of the vehicle speed decreases rapidly and would result in an "aggressive" deceleration.

Alternatively, the drive lever may provide a proportional speed control which means that the acceleration rate depends on the deflection angle or the deflection speed. In this case, an acceleration grade input 73 may not be present but the status parameter $SP_{AS}$ would be set depending on deflection angle or speed.

If parameter $V_{DLminus}$ is set to 0, which indicates that the vehicle is not decelerated via the drive lever 72, activation branch B212 is further executed in which further operator inputs are checked.

Therefore branch B212 branches of in branch B213, B214 and B215.

With branch B213 the process checks deactivation of the cruise control in step S230. If YES, the deceleration via the speed foot paddle 71 is checked with step S232. The speed foot paddle 71 is depressed by the operator's foot and forwards the speed demand to the ECU. This is different to the driver lever 72 in that the deflection angle is proportional to the demand value for the vehicle speed. In other words, if fully depressed, the demand is maximum vehicle speed or alternatively any vehicle speed limit value which the driver can set via the HMI terminal 75. E.g. if the vehicle is operated for shunting, the driver may set a lower speed assigned to full pedal depression to increase the pedal resolution and enable finer control. If speed foot paddle 71 is fully released (after any depression), the demand for the vehicle speed is zero kph, which means that the vehicle is decelerated. So step S232 checks if the pedal mode is activated. If not, depressing the speed foot paddle 71 would not impact the vehicle movement but only adjust engine speed. As a consequence, the loop L233 returns prior to step S205.

Step S234 checks if the speed foot paddle 71 is completely released (after depression), so that $V_{FP}$ is set to 0. If not, the loop L235 returns prior to step S205.

If YES, step S236 sets the status parameter $sp_{DL}$ to zero. With reference to step S225, in which the parameter is set depending on operation of the drive lever 72, status parameter $sp_{DL}$ is generally providing the information if speed foot paddle 71 or drive lever 72 indicate deceleration.

If step S230 indicates activation of the cruise control, branches B213 is proceeded to determine subsequent condition present in cruise control mode.

Therefore, step S240 determines if the current vehicle speeds exceeds the set point of the cruise control.

This occurs in a first cruise control condition wherein the set point of the cruise control is changed by:

Firstly, the HMI terminal enable driver to save to set points C1 and C2 for different cruise control set points. Both values can be pre-selected by pushing a button assigned to C1 and C2 which may be positioned close or on the drive lever 72. Driver use this HMI function to e.g. switch from a set point used in the field or on the road, e.g. if the C1 is 18 kph for field work and 60 kph for fast travel on roads. The driver activate the set point of the cruise control by using the drive lever 72. While the drive lever 72 is used to accelerate or decelerate the vehicle by moving in driving direction forwards and backwards, moving the drive lever 72 briefly to the right is used to activate cruise control. If none of the values C1 or C2 is pre-selected, the current speed is taken as new set point value.

Secondly, the driver can adjust the set point of the cruise control in the HMI terminal 75 which may also result in a significant deceleration if the new set point is chosen below current vehicle speed.

Even if there is no significant set point speed reduction, cruise control mode may still result in a situation where electronic trailer braking is demanded, referred to as the second cruise control mode. This may happen if the vehicle combination drives in cruise control mode on an even course and then enters a downhill passage. The weight of the trailer would then start to push the tractor resulting in an increase of the vehicle speed and a deviation from the set point.

So to summarize, step S240 determines conditions in cruise control mode in which the vehicle speed is considerably changed with $v_V > f_{CAv} * v_{SET}$ which is when the current vehicle speed $v_V$ exceeds the speed set point $v_{SET}$ of the cruise control about a factor $f_{CAv}$. The factor $f_{CAv}$ represents a percentage variation, so that $f_{CAv}=1.05$ means that the current vehicle speed $v_V$ exceeds the speed set point $v_{SET}$ about 5%.

If the condition $v_V > f_{CAv} * v_{SET}$ is not met, loop L241 returns prior to step S205.

If the condition $v_V > f_{CAv} * v_{SET}$ is met, step S242 sets the status parameter for activation in cruise control mode $SP_{CC}$ to 1 indicating the activation of electronic trailer braking based on a condition in cruise control mode.

As in the first cruise control mode the degree of deceleration depends on the setting of the acceleration rate input 73, the status parameter $SP_{AS}$ is stored in step S243 similar to step S226.

As in the second cruise control condition the degree of deceleration does not depend on the setting of the acceleration rate input 73, status parameter $SP_{AS}$ may always set to one single value, say 2, when the set point is not changed but the vehicle speed increases relative to set point on downhill drive in second cruise control mode.

A further condition is checked with branch B214 in which the process determines reversing of the tractor. Reversing of the tractor or the vehicle combination means that the operation of the tractor is changed from a first, say forward direction at a predetermined vehicle speed to the opposite direction with the same or a preselected vehicle speed. So reversing always results in deceleration which may cause push condition so that electronic trailer brake must be activated. Reversing can be activated by an operator user interface. The tractor is than decelerated, passes standstill and is changed to the opposite direction driving without further manual intervention. This function offers a comfortable maneuvering, e.g. during front loader operation. Reversing of the tractor 10 can be initiated by various inputs:

- While the drive lever 72 is used to accelerate or decelerate the vehicle by moving in driving direction forwards and backwards, moving the drive lever 72 to the left is used to activate reversing.
- Furthermore, a button is provided nearby the steering wheel, e.g. on the indicator lever to reverse the tractor 10.

In addition the driver can chose if reversing is provided only by changing the direction, but with the same speed, or changing direction and decelerate/accelerate to a set point which can be pre-selected in the HMI terminal 75 for each driving direction. This is advantageous drivers may prefer to drive slower in rearward driving So along branch B214 followed by step S250, the method checks if the tractor is reversed. If NO the loop L251 returns prior to step 205.

If the condition is met the status parameter $SP_{REV}$ is set to 1 in step S252 and as the degree of deceleration depends on the setting of the acceleration rate input 73, the status parameter $SP_{AS}$ is stored in step S253.

Further branch B215 and step S260 monitors a decrease of the engine speed. The HMI terminal enable driver to save to set points MAX and MIN for different engine speed set points. Both values can be selected by pushing a button assigned to MAX and MIN which may be positioned close or on the drive lever 72. Alternatively, tractor 10 may be equipped with a hand throttle (not shown) which enables the driver to directly adjust engine speed via a rotary control. As significantly reducing the engine speed results in deceleration, step S260 monitors engine speed difference with $\Delta n_{ENG} > \Delta n_{CAmax}$ and if the engine speed is reduced about more than say $\Delta n_{CAmax} = 200$ rpm, the status parameter $SP_{ENG}$ is set to 1 indicating the activation of electronic trailer braking based on engine speed reduction. This branch may additionally include the determination of a further status parameter to consider a degree of deceleration depending of the absolute value of the difference in engine speed $\Delta n_{ENG}$. The bigger $\Delta n_{ENG}$ is the higher deceleration may be so there may be different deceleration status parameter values for e.g. $\Delta n_{ENG} = 200$ rpm or $\Delta n_{ENG} = 400$ rpm or $\Delta n_{ENG} = 600$ rpm.

All activation branches B211, B212, B213, B214, B215 merge to step S270 in which, when one of the activation requirements in branches B211 to B215 is met, the status parameter $SP_{AS}$ is set to 1, indicating that the activation is generally enabled, independent of whether by drive lever 72 or speed foot paddle 71 or any other condition caused the activation.

With step S250, the method proceeds to step 120 as depicted in FIG. 2.

Parallel to step S200, the step S300 determines the actual coupling force $F_{c,\ actual}$ by considering various driving dynamic parameters as depicted in FIG. 4.

The determination of the actual coupling force $F_{c,\ actual}$ is further explained with reference to FIG. 6a which dramatically depicts the forces exerting on a vehicle combination 1, especially on tractor 10, for the driving condition in which the vehicle combination 1 is driving uphill and in which the danger of jack-knifing is especially high.

The equilibrium of forces applied on the tractor 10 is well known in the art and results in the following equation:

$$F_{TRC} = F_{IN} + F_H + F_{AR} + F_{R,RA} + F_{R,FA} + F_C \quad (E1)$$

Wherein $F_{TRC}$ is the Tractive Force which must be supplied to wheels 5,6 of the tractor 1 by the IC engine and the transmission 50 to move the complete vehicle combination 1.

$F_{IN}$ is the Inertia Force which applies due to the inertia when the vehicle is accelerated or decelerated:

$$F_A = m_v \cdot a \quad (E2)$$

$F_H$ is the Downhill-slope Force which applies due to the inertia when the vehicle is driving uphill or downhill:

$$F_H = m_v \cdot g \cdot \sin(\alpha) \quad (E3)$$

$F_{AR}$ is the Air resistance Force applied by air resistance and depends on various factors such as the geometry of the tractor $F_{R,RA}$, $F_{R,FA}$ Is the Roll Resistance Force applied by rolling resistance between wheel and ground an depends various parameters such as wheel load and ground/wheel contact parameters $F_C$ Is the Coupling Force which represents the force applied by the trailer to the tractor. In case of deceleration the coupling force is of negative sign.

The mass $m_v$ of the vehicle is determined according the prior art and is not described in detail. The mass my may be determined by considering the empty weight of the tractor plus additional ballast attached thereto. These values may be stored in the ECU. Alternatively, mass values could be taken from vehicle acceleration or wheel load detection. A method is described in applicant's published patent application EP2766239.

The same applies to the determination of the vehicle acceleration a, inclination $\alpha$ and speed v of the vehicle which is described and practised in the art. Both values may be determined by gyroscope 60 which may be part of a GPS navigation system.

Figure 6A:
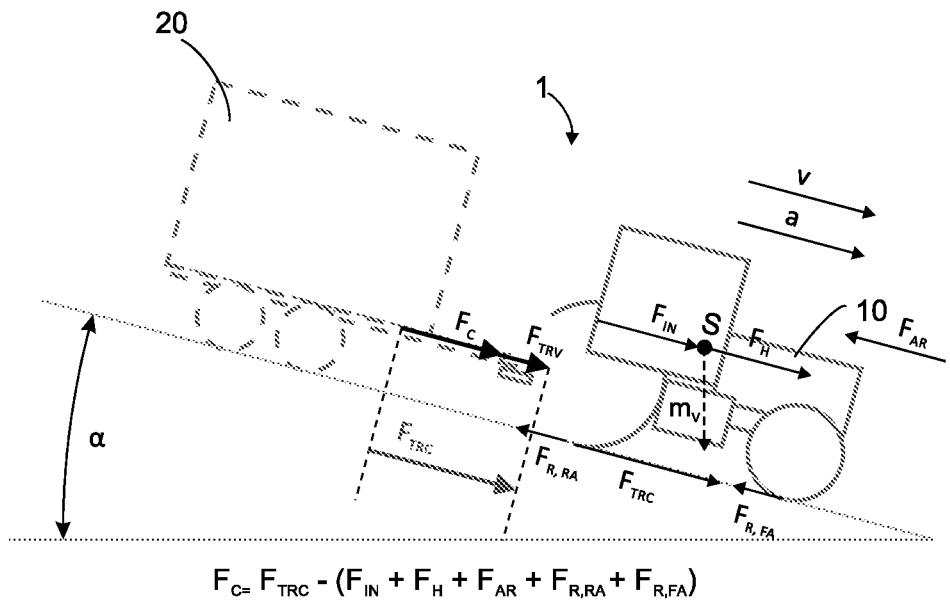
FIG. 6b is a characteristic map showing the resistance force depending vehicle speed.

The force must be inserted with negative or positive signs according the effective direction shown in FIG. 6a.

Similar forces would occur resulting from mass of the trailer and resistances applied on the trailer itself. But the method only considers the resulting forces applied by the trailer to the tractor, which the coupling Force $F_C$. Only consider parameters applied to the tractor has the major advantages, that the trailers must not be equipped with sensors or considered in detail. As mentioned above, the variety of different trailers/implements and their basic technical configuration may impede detailed considerations of the trailer.

As mainly Coupling Force $F_C$ is the relevant parameter to control the trailer brake system, the equation E1 is changed:

$$F_C = F_{TRC} - (F_{IN} + F_H + F_{AR} + F_{R,RA} + F_{R,FA}) \quad (E4)$$

The forces in brackets represent the Tractive Force of the towing vehicle $F_{TRV}$.

$$F_{TRV} = F_{IN} + F_H + F_{AR} + F_{R,RA} + F_{R,FA} \quad (E5)$$

While the Inertia Force $F_{IN}$ and downhill-slope Force $F_H$ can be easily determined during operation using the parameters already available on the tractor, the air resistance force $F_{AR}$ and Roll Resistance Force $F_{R,RA}$, $F_{R,FA}$ is summarised to an Overall Resistance Force $F_R$.

$$F_{TRV} = F_{IN} + F_H + F_R \quad (E6)$$

Figure 6B:
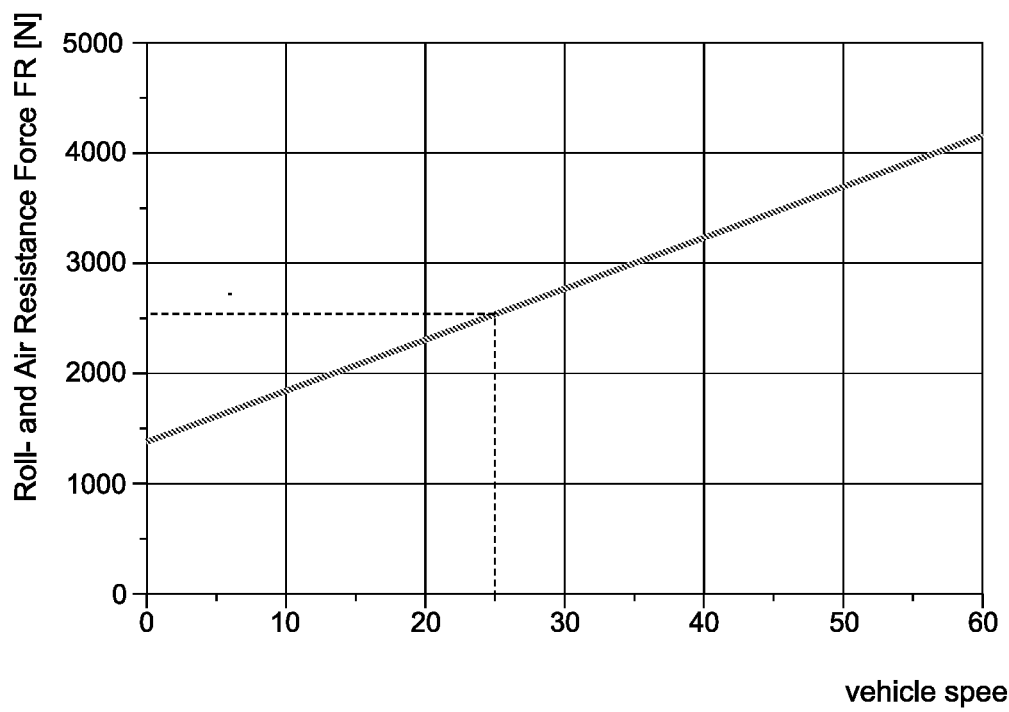

The Overall Resistance Force $F_R$ is taken from the graph shown in FIG. 6b in which the vertical axis shows the Overall Resistance Force $F_R$ and the horizontal axis shows the vehicle speed v. The graph is determined by coast down tests during development and is then stored for each vehicle series in the ECU. The shown graph is determined for a vehicle on asphalt (or road operation). Alternatively, further graphs may be determined for grassland, farmland or gravel tracks which could then be considered when the vehicle is provided with means to detect on which terrain the vehicle drives. This may be determined by GPS navigation system which delivers the geographic information, eg. if the vehicles is driving on a public road (on asphalt), on a gravel track or offside any road, which may be grassland or farmland.

E.g. in the shown graph the Overall Resistance Force $F_R$ at say 25 kph is considered to be 2575 N So by using equations E1 and E2 and the graph shown in FIG. 6b the Tractive Force of the towing vehicle $F_{TRV}$ can be adequately determined with equation E6.

To receive the Coupling Force $F_C$, the remaining equation is:

$$F_C = F_{TRC} - F_{TRV} \quad (E7)$$

The Tractive Force of the vehicle combination FTRC is determined as known in prior art by measuring the fluid pressure in a Continuously Variable Transmission (CVT) of the hydrostatic-mechanical split type which includes a hydraulic drive circuit in which a hydraulic pump supplies pressurized fluid to a hydraulic motor. Details are explained in applicant's published patent application WO2013/053645 and are no explained in detail. Alternatively, any other means to determine the Tractive Force of the vehicle combination FTRC such as using the torque supplied by the engine to receive the tractive force as described in U.S. Pat. No. 4,548,079 may be taken instead. (See GB11/44)

The Coupling force can then be received with equation E7.

Using afore mentioned equations and forces the method in FIG. 4 is proceeded. After starting with step 301, a first branch B305 determines the Tractive Force of the vehicle combination $F_{TRC}$ in step S335 as explained above.

A second branch B310 determines the mass $m_v$, acceleration a and the inclination α in step S320 as explained above to further calculate Inertia Force $F_{IN}$ in step S325 and downhill-slope Force $F_H$ in step 326.

In a third branch B315, step S330 determines speed v of as explained above to further determine Overall Resistance Force $F_R$ in step S331 with reference to FIG. 6b.

Second branch B310 and third branch B315 then proceeds into step S340 to calculate Tractive Force of the towing vehicle $F_{TRV}$ as defined with equation E6.

Finally, the values received in step S335 and S340 are then used to calculate the actual Coupling Force $F_{C,actual}$ according equation E7.

Alternatively the steps shown in FIG. 4 may be proceeded in one by one or in any reasonable order.

With reference to FIG. 2, sub process S300 is permanently proceeded to deliver the actual Coupling Force $F_{C,actual}$ for further steps.

The method M100 in FIG. 2 further continues with permanently monitoring the status parameter $SP_{CA}$ in step S110 which indicates that the driver still demands vehicle deceleration via speed foot paddle 71 or drive lever 72. If the activation is interrupted and status parameter $SP_{CA}$ is changed to zero, the loop L211 resets all parameters in step S115 and returns to START.

The method M100 in FIG. 2 further continues with step S120 which is setting a first interval counter c, also referred to as the brake interval counter) to zero. Then in step S121 a first timer value to is also set to zero (seconds) and a timer is started. Both parameters are provided to fulfil the requirements for electronic trailer brake systems according EU-Regulation 2015/68 (dated 15 Oct. 2014), Appendix I, Number 2.2.1.19.1 (also referred to as "EU Mother regulation RVBR") which limits the duration of electronically activated trailer braking (without the driver operating the service brake) to a maximum duration of 5 s. After this the trailer brake must be released.

The first time value to is used to monitor the time limit while the brake interval counter c is used to determine the number of the brake intervals. A brake interval is thereby characterised by a time period in which the electronic trailer brake control is activated/enabled and may be followed by an optional pause time, in which the trailer brake is not activated. The next brake interval starts when the trailer brake is activated again after being in pause. The brake interval is thereby interrupted if activation requirements as described in step 200 are not meet and status parameter $SP_{CA}$ returns to zero. This results in the reset of all parameters in step 115 and thereby also the first interval counter c and first timer value $t_0$, discussed in detail herein.

Step S125 checks if the method is currently proceeding in the first brake interval (meaning that the time limit has not been exceeded) or in a subsequent brake interval.

If YES step S131 sets the pilot pressure $p_P = P_{P,0}$ which solely depends on the driver deceleration demand DD as determined in step S200. Generally, pilot pressure $p_P$ increase with higher deceleration demand:

If the deceleration results from the operator using the speed foot paddle 71 (resulting in the status parameter $SP_{DL}=0$), the pilot pressure $P_{P,0}$ is set to 70 kPA.

If the deceleration results from the operator using the drive lever 72 (resulting in the status parameter $SP_{DL}=1$), the pressure level depends on setting of the acceleration rate input 73 which is provided by status parameter $SP_{AS}$:

For $SP_{AS}=1$ (acceleration rate input 73 set to level I representing slowest deceleration), the pilot pressure $P_{P,0}$ is set to 50 kPA.

For $SP_{AS}=2$ (acceleration rate input 73 set to level II), the pilot pressure $P_{P,0}$ is set to 70 kPA.

For $SP_{AS}=3$ (acceleration rate input 73 set to level III), the pilot pressure $P_{P,0}$ is set to 100 kPA.

For $SP_{AS}=4$ (acceleration rate input 73 set to level IV), the pilot pressure $P_{P,0}$ is set to 150 kPA.

The same values are taken if the deceleration results from the cruise control (Receiving YES in step S240) resulting in the status parameter $SP_{CC}=1$ in step S242 or if the deceleration results from the reversing mode being activated (Receiving YES in step S250) resulting in the status parameter $SP_{REV}=1$ in step S252.

If the deceleration results from the engine speed decrease with step S260 resulting in YES (and the status parameter $SP_{ENG}$ set to 1), the pilot pressure $P_{P,0}$ is set to 80 kPA In the embodiment, the set values for pilot pressure $P_{P,0}$ depending on status parameter $SP_{AS}$ are shared over different deceleration conditions (with one of status parameters $SP_{DL}$, $SP_{CA}$, $SP_{CC}$, $SP_{REV}$, $SP_{ENG}$ set to 1) but may alternatively be defined differently for each deceleration conditions.

The values are kept in the ECU and taken considered further in step S140 explained herein.

If step S125 shows that the method is currently proceeding in a subsequent brake interval, step S132 sets the pilot pressure $p_P = p_{P,c}$ which is the trailer pressure signal TBS generated at step S150. This results in the advantage that after the end of a brake interval, the pilot pressure $p_P$ always receives the value which was last generated in the previous brake interval. This avoids trailer brake signal peaks between brake intervals which would decrease driving comfort.

In step S135, a trailer brake signal TBS is generated, also referred to "First-in-Shot". This step serves to provide a pressure peak which is used to fill the lines on the trailer. As the trailers in agricultural business vary in size and therefore also the lines of the trailer brake systems may vary, this step is provided to keep bias the system and make it more responsive. The height of the Trailer brake signal TBS, or the trailer brake actuation pressure must be chosen high enough to fill the lines but low enough to avoid an excessive brake reaction which would result in jerking and negative impact on driving comfort. Therefore the "First-in-Shot" is time controlled and depends on the driver deceleration demand DD as determined in step S200.

If the deceleration results from the operator using the speed foot paddle 71 (resulting in the status parameter $SP_{DL}=0$), the first-in-shot-pressure $P_{FIS}$ is to 300 kPA and the duration is set to 0.03 s If the deceleration results from the operator using the drive lever 72 (resulting in the status parameter $SP_{DL}=1$), the pressure level and duration depends on setting of the acceleration rate input 73 which is provided by status parameter $SP_{AS}$:

For $SP_{AS}=1$ (acceleration rate input 73 set to level I representing slowest deceleration), the first-in-shot-pressure $P_{FIS}$ is to 300 kPA and the duration is set to 0.02 s.

For $SP_{AS}=2$ (acceleration rate input 73 set to level II), the first-in-shot-pressure $P_{FIS}$ is to 300 kPA (alt. 320 kPA) and the duration is set to 0.03 s.

For $SP_{AS}=3$ (acceleration rate input 73 set to level III), the first-in-shot-pressure $P_{FIS}$ is to 300 kPA (alt. 340 kPA) and the duration is set to 0.04 s.

For $SP_{AS}=4$ (acceleration rate input 73 set to level IV), the first-in-shot-pressure $P_{FIS}$ is to 300 kPA (alt. 360 kPA) and the duration is set to 0.05 s.

The same values are taken if the deceleration results from the cruise control (Receiving YES in step S240) resulting in the status parameter $SP_{CC}=1$ in step S242 or if the deceleration results from the reversing mode being activated (Receiving YES in step S250) resulting in the status parameter $SP_{REV}=1$ in step S252.

If the deceleration results from the engine speed decrease with step S260 resulting in YES (and the status parameter $SP_{ENG}$ set to 1), the pilot pressure $P_{P,0}$ is set to 80 kPA In the embodiment, the set values for first-in-shot-pressure $P_{FIS}$ is to 300 kPA and the duration depending on status parameter $SP_{AS}$ are shared over different deceleration conditions (with one of status parameters $SP_{DL}$, $SP_{CA}$, $SP_{CC}$, $SP_{REV}$, $SP_{ENG}$ set to 1) but may alternatively be defined differently for each deceleration conditions.

In addition, two correction factors $f_1$, $f_2$ are multiplied with the first-in-shot-pressure $P_{FIS}$ to determine the trailer brake signal $p_{TBS}$:

$$P_{TBS} = f_1 \times f_2 \times P_{FIS} \tag{E8}$$

The Correction factor $f_1$ is in a range between >0 . . . 1 and considers the fact that with increasing vehicle speed, high First-in-Shot pressure peaks result in that the trailer tends to jerk which negatively impacts the driving comfort. On the other hand, when the vehicle combination 1 drives downhill, the trailer brake system reaction should be as fast as possible. The equation for correction factor $f_1$ is:

$$f_1 = \frac{V}{V_{Limit}} + \frac{\alpha}{\alpha_{Limit}} - \frac{\alpha * V}{\alpha_{Limit} * V_{Limit}} \tag{E8.1}$$

Whereby $V_{Limit}$ is the vehicle speed, below which the First-in-Shot pressure shall be reduced. This value is set to 25 kph $\alpha_{Limit}$ is the inclination, below which the First-in-Shot pressure shall be at maximum level independent of the vehicle speed. This value is set to $-5°$ The Correction factor $f_2$ is also in a range between >0 . . . 1 and considers the fact pressure level of the "First-in-Shot" is reduced during the process to avoid overshoots in the trailer brake actuation pressure reducing driving comfort. The equation for correction factor $f_2$ is:

For first brake interval (C=0):

$$f_2 = \frac{P_{P,0}}{P_{Limit}} \tag{E8.2}$$

For any subsequent brake interval (C>0):

$$f_2 = \frac{P_{P,c}}{P_{Limit}} \tag{E8.3}$$

Whereby $P_{P,0}$ is the pilot pressure determined in step S131 taken from a predetermined parameter set.

$P_{P,c}$ is the pilot pressure determined in step S132 taken from a previous brake interval $P_{Limit}$ is a pressure limit below which the First-in-Shot" is increasingly reduced. May be 100 kPA After step the time controlled generation of the trailer brake signal TBS in step S135, step S140 is straight away generating a trailer brake signal TBS based on the pressure determination as described in Steps 131, 132. The trailer brake signal TBS generated in step S135 is maintained constant until the ECU is generating a further pressure signal TBS as explained herein.

Applying a pilot pressure depending on the deceleration condition indicated by an HMI input offers the main advantage that trailer brake actuation is initially started without determining the physical values for deceleration or coupling force at first so that the trailer brake activation is more proactive and faster. Even with step S206a considering a coupling force, the pilot pressure does not depend in size at an initial step.

In step S145 the process is waiting for 0.75 s to enable the ECU to determine the actual coupling force $F_{C,actual}$ as described with step S300. The waiting period is necessary to consider the effects of the trailer brake signals TBS generated with steps S135, S140 and the resulting changes in the actual coupling force $F_{C,actual}$. Otherwise, the ongoing process would be based on a coupling force $F_{C,actual}$ which is still changes under the influence of steps S135, S140.

Especially step S140 serve to provide a fast reaction on the deceleration in form of trailer brake signal TBS based on predetermined pressure values while in the ongoing process, a 3-point control algorithm is applied to determine trailer brake signal TBS. This makes the system responsive in the first.

The control algorithm is executed with step S400 as explained in detail in FIG. 5.

Step S400 and the subsequent steps S401 to S490 mainly contains the steps to control the trailer brake signal TBS by means of a 3-point controller. Generally a 3-point controller represents a discontinuous controller type and takes three values, which are 1, 0 and −1. Regarding the generation of trailer brake signal TBS, trailer brake signal TBS, respective the pressure value is increased, kept constant or decreased. Compared to continuous controller types, such as P, I, or D-Controllers or combinations of them, the 3-point controller tends less to overshooting and can be handled easier in terms of setting parameters to influence the controller dynamics. Especially these values may be easier adapted to operating conditions, which may be done by the driver or trained service personal.

After the start with step S401, step S405 is setting a status parameter, the In-Shot parameter $SP_{IS}$. An In-Shot is a time controlled pressure peak similar to the First-in-Shot explained with step S135 but is applied in combination with the 3-point controller. If the In-Shot parameter $SP_{IS}=0$, no In-shot is provided, if the In-Shot parameter $SP_{IS}=1$ an In-shot is provided. The in-Shot serves to increase responsiveness by supporting the pressure build up in the trailer brake system 40. But as pressure peaks may result in jerking of the trailer, the In-Shots may be deactivated if the Coupling force (which is permanently determined shows) a rapid decrease. As a rapid decrease (determined in Step S300) indicates a fast reaction to trailer brake signal TBS further In-shots may be omitted. The in-shot is explained in more detail herein.

In parallel (or subsequently) with steps S405, step S406 is proceeded in which the ECU takes the predetermined values defining a coupling force range defined by lower coupling force $F_{C,L}$ and a upper coupling force $F_{C,L}$ which is need to realize a 3-point controller and which is explained herein.

Next a second interval counter i, also referred to as the controller interval counter, is set to zero in step S407.

The controller interval counter i is used to determine the number of the control interval in step S410. In the first interval with counter i=0 the method proceeds with step S415 in which the controller pressure $p_{PC,0}$ is set to the value pp which was determined in step S140.

For the next interval (i>0) and with step S416, the controller pressure $p_{PC,0}$ is taken from the subsequent controller interval as stored in step S465 and depicted with $p_{PC,i}$. This results in the advantage that after the controller pressure $p_{PC,0}$ always receives the value which was last generated in the previous controller interval. This avoids trailer brake signal peaks between brake intervals which would decrease driving comfort.

With step S420, the 3-point controller is adjusting the pressure values based on the initial settings of controller pressure $p_{PC,0}$ in step S415, S416.

Coming back to step S406, the coupling force band defined by lower coupling force $F_{C,L}$ and upper coupling force $F_{C,L}$ is now explained in detail. Both values have a negative sign (as they are counteracting the vehicle) and are needed to operate the 3-point controller.

The lower coupling force $F_{C,L}$ represents a value which shall not be undercut as this may cause the vehicle 10 to become unstable due to the force applied and the resulting yaw moment about the vertical vehicle axis. This value is stored in the ECU and may vary for different vehicle configurations. E.g. a lightweight vehicle cannot bear the same force/yaw moment compared a vehicle 10 with higher weight. The same applies depending on wheel base or wheel width which also influence the vehicle stability.

The upper coupling force $F_{C,L}$ represents a value which shall not be exceed as the brake actuation shall be stopped before the coupling force gets zero. Driver's demand that the trailer is allowed to coast e.g. when the vehicle combination 1 approaches a road crossing. This means that a small coupling force is acceptable.

With steps S420, S435 and S437 the 3-point controller checks the value of the actual coupling force $F_{C,actual}$ relative to the coupling force band defined by lower coupling force $F_{C,L}$ and upper coupling force $F_{C,L}$.

If the actual coupling force $F_{C,actual}$ is within the coupling force band, step S430 is setting the controller pressure $p_{PC,i}=p_{PC,0}$ which means that the pressure value determined in step S415 or S416 is taken without pressure adaption.

If the actual coupling force $F_{C,actual}$ undercuts the lower coupling force $F_{C,L}$ as checked in step S435, branch B436 is proceeded and step S438 is setting a controller pressure increase with $\Delta P_{PC}=\Delta P_{PC,set}$. The value for $\Delta P_{PC,set}$ is stored in the ECU and is 15 kPA. This means, that the pressure will be increased to increase brake force on the trailer.

If step 435 is not met, the actual coupling force $F_{C,actual}$ exceeds the upper coupling force $F_{C,U}$, branch B437 and step S439 is setting a controller pressure increase with $\Delta P_{PC}=-\Delta P_{PC,set}$. This means, that the pressure will be decreased to reduce brake force on the trailer.

The method then proceeds in two parallel branches into the steps encircled with a dotted line 440 which serve to apply the In-shot not.

Following the branch B436, if the In-Shot parameter $SP_{IS}$ was set to 1 in step S405 (indicating In-shot activation), step S441 results in that step S445 is proceeded. Otherwise the method proceeds to Step 451 without applying in-shot. In step S445 the In-shot parameters are set to define a time-controlled pressure increase with $\Delta P_{IS}=\Delta P_{IC,set}$ for a duration of $t_{IS}=t_{IS1}$. The value $\Delta P_{IC,set}$ and the time $t_{IS1}$ is stored in the CU and is 100 kpa and 0.05 s.

Following the branch B437, if the In-Shot parameter $SP_{IS}$ was set to 1 in step S405 (indicating In-shot activation), step S442 results in that step S446 is proceeded. Otherwise the method proceeds to Step 451 without applying in-shot. In step S446 the In-shot parameters are set to define a time-controlled in-shot pressure increase with $\Delta P_{IS}=-\Delta P_{IC,set}$ for a duration of $t_{IS}=t_{IS2}$ (which is decrease due to the negative sign). The value $\Delta P_{IC,set}$ and the time $t_{IS2}$ is stored in the CU and is 100 kpa and 0.1 s. The duration in this step is greater as with step S445 due to the fact that the reaction time of the trailer brake system is higher when the pressure is decreased. This is balanced by a longer in-Shot duration.

Both steps S445 and S446 are continued in step S450 in which pressure values are set:

As the in-Shot was activated, the In-shot pressure $P_{IS}$ is calculated by the equation $$p_{IS}=p_{PC,0}+\Delta p_{PC}+\Delta p_{IS} \quad (E9.1)$$

This means that the pressure for the In-shot is received by the sum of the controller pressure $p_{PC,0}$ (as set in step S415 or step S416), the controller pressure increase $\Delta P_{PC}$ (as set in step S438 or step S439) and the in-shot pressure increase with $\Delta P_{IS}$ (as set in step S445 or step S446).

In addition the controller pressure $p_{PC,i}$ is calculated by the equation $$P_{PC,i}=p_{PC,0}+\Delta p_{PC} \quad (E9.2)$$

This means that the pressure for the controller pressure is received by the sum of the controller pressure $p_{PC,0}$ (as set in step S415 or step S416), the controller pressure increase $\Delta P_{PC}$ (as set in step S438 or step S439) but without the in-shot pressure increase with $\Delta P_{IS}$.

In step S455 the ECU generates a trailer brake signal TBS with the trailer brake signal $p_{TBS}=p_{IS}$ for a duration $t_{IS}$. This step overwrites the trailer brake signal TBS generated in step S140 (in FIG. 2).

If the in-Shot was not activated in steps S441 or S442 the controller pressure $p_{PC,i}$ is calculated in step S451 by the equation $$P_{PC,i}=p_{PC,0}+\Delta p_{PC} \quad (E9.3)$$

After one of step S430 or step S451 or step S455, the method proceeds with step S460 which generates a trailer brake signal $p_{TBS}=P_{PC,i}$ determined in step S430, step S450 or step S451. This brake signal is not time-controlled and thereby upheld until the next controller interval.

The last value of the trailer brake signal TBS is then saved in the ECU with step S465 for consideration in the next controller interval in step S416.

Alternatively step S430 may result in that the method is proceeds with step S465 as there is no pressure increase and the trailer brake pressure generated in step S140 (see FIG. 2) is still upheld.

In step S475 the controller interval counter i is increased by 1 for characterising an subsequent interval as requested for step S410.

In step S480 the timer value for $t_0$ is controlled, if the timer value $t_0$ is below 4 s, the method proceeds with loop L481 which includes step S485 so that the process is waiting for $t_3=0.5$ s to enable the ECU to determine the actual coupling force $F_{C,actual}$ as described with step S300 and return.

In step S145 the process is waiting for 0.75 s to enable the ECU to determine the actual coupling force $F_{C,actual}$ as described with step S300 and then return prior to step 410.

If in step S480, the timer value to exceeds 4 s, step S490 aborts the sub process S400 and returns to main method M100 depicted in FIG. 2.

To summarise, sub process S400 is continuously adapting the trailer brake signal TBS by applying the 3-point controller and an optional In-shot until the time of 4 s is reached. In the meantime, the process passes several controller interval, whereby subsequent interval are based on the trailer brake signal TBS generated in the previous interval.

Coming now back to FIG. 2, step S150 saves the last value of the trailer brake signal in the ECU for consideration in the next brake interval in step S132.

Afterwards in step S475 the brake interval counter c is increased by 1 for characterising an subsequent interval as requested for step S125.

As already mentioned, the timer value $T_0$ is provided to ensure that the brake actuation is not active for more than 5 s. To avoid that the trailer brake signal TBS (and the brake actuation) abruptly falls to zero, the sub process S400 is aborted after 4 s. The remaining time of 1 s is used to ramp down the trailer brake signal TBS to zero before the 5 s are passed.

Depending on the last trailer brake signal TBS and the cycle time of the ECU (which is the time required for the execution of one simple processor operation in the ECU) step S156 calculates a ramp pressure decrease $\Delta p_R$ according the equation:

$$\Delta p_R = \frac{t_c \times p_{tbv}}{t_R} \quad (E10)$$

Whereby
- $t_C$ is the cycle time of the processes in the ECU, which is 50 ms
- $t_R$ is the ramp time, which is 1 s
- $P_{TBV}$ is last trailer brake signal TBS For a last trailer brake signal TBS of 100 kPa equation E10 would determine a ramp pressure decrease $\Delta p_R$ of 4 kPa.

So as long as step S160 does not show that the trailer brake signal TBS is zero, the loop L161 and step S162 is repeatedly proceeded to generate a trailer brake signal TBS which is reduced with $\Delta p_R$. The loop L161 is repeated and returns prior to step S160 until the trailer brake signal TBS is zero.

As long as the activation signal is present in step S165 with $SP_{CA}=1$ the process proceeds with loop L166 in which step S170 contains a waiting period of $t_2=1$ s and returns prior to step S121 to proceed with the next brake interval.

If step S165 determines that the activation signal is not present, step S175 checks if a shut-down condition is met so that the method is ended with step S180. We have chosen Ignition OFF in step S175.

Figure 7:
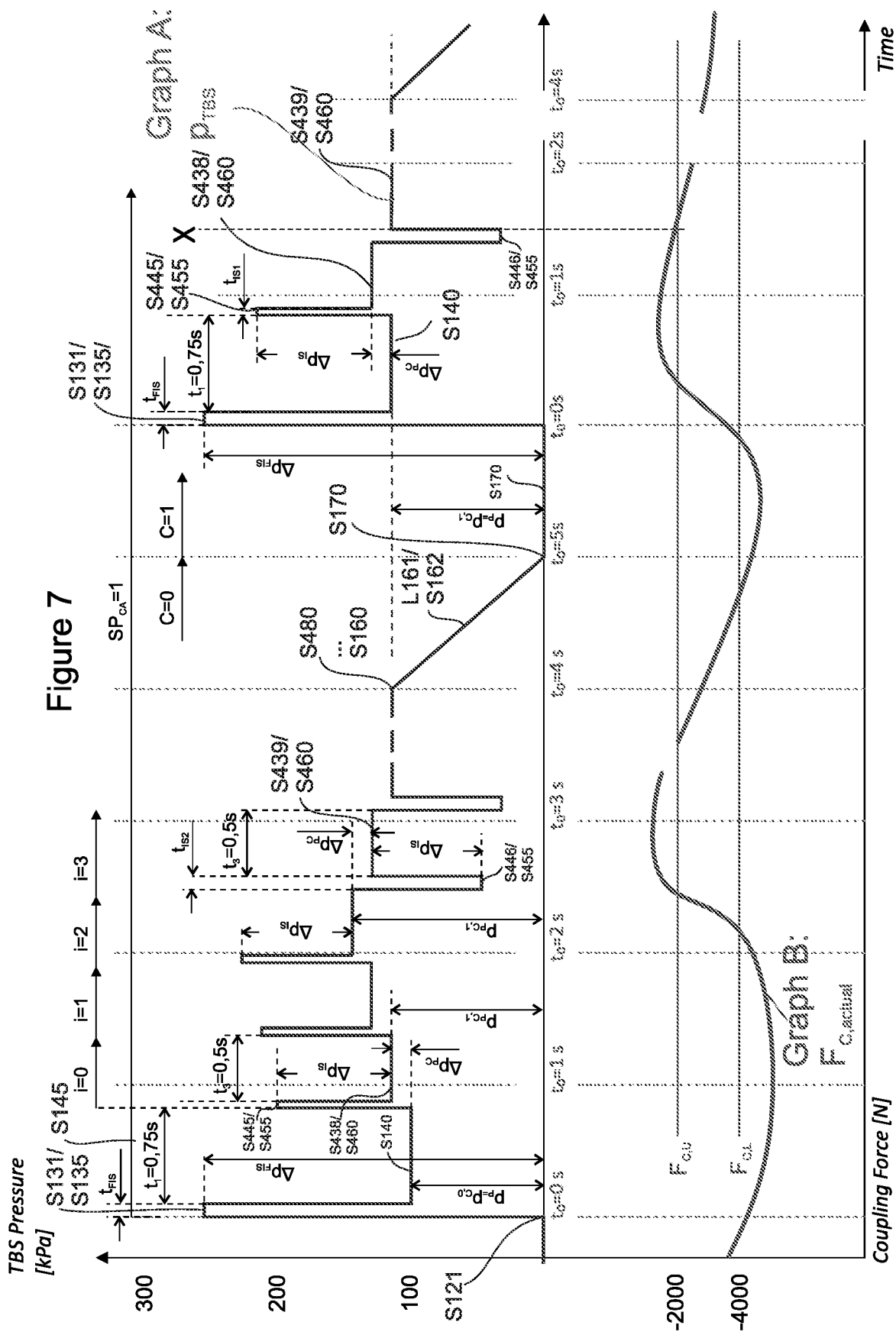
FIG. 7 is a characteristic map showing the results of method to control the trailer brake control signal (TBS) according to the invention.

FIG. 7 briefly depicts the results of the method according the invention.

The horizontal axis depicts the time in which the method proceeds.

The vertical axis is shows two portions:
- The upper portion depicts the trailer brake signal TBS with pressure $p_{TBS}$
- The lower portion depicts the measured coupling force $F_{C,actual}$ as determined with step S300 including the coupling force band defined by $F_{C,U}$ and $F_{C,L}$ whereby $F_{C,U}=-2000$ Newton and $F_{C,L}=-4000$ Newton. The graph B of the measured coupling force $F_{C,actual}$ is smoothened as with the cycle time of 50 ms the curve would show permanent oscillations As best seen with graph A the timer value for to is set to zero at step S121. As this is the first brake interval with C=0, step S131 determines the Pressure value $P_{FIS}$ of the First-In-Shot which is then generated at step S135. During the waiting period in step S145, the Pilot pressure $P_P$ is kept. Then the process proceeds to step S400.

Based on the actual pressure, the In-Shot with $p_{IS}$ is applied with step S455 based on the determination in steps S438, S445, S450. Then, in step S460, the controller pressure $P_{PC}$ is generated based on the determination in step S438. The steps S438, S445, S450 deliver an positive pressure increase as the coupling force $F_{C,actual}$ is below $F_{C,L}$. This is repeated until the coupling force $F_{C,actual}$ is above the $F_{C,L}$. Then a negative pressure increase is determined in steps S439, S446, S450 for generating the in-shot $p_{IS}$ in S455 and the controller pressure $P_{PC}$ in step 460.

This is provided until in step S480, timer to reaches 4 s and the 3-point-controller is aborted. Next, the trailer brake signal TBS and pressure $p_{TBS}$ is ramped down in steps L161/s162. After 5 s (overall, or is of down ramping) the pressure $p_{TBS}$ is to zero. A waiting period of 1 s is then applied with step S170.

If the activation signal is kept alive, the process starts again with the next brake interval (c=1), but then starts with the pressure value form previous interval $P_{PC,1}$ through step S132 and applies First-in-Shot, In-shot and Pressure control as described before.

At the time indicated with dotted line X the coupling force $F_{C,actual}$ is in the coupling force band so that the trailer brake signal TBS and pressure $p_{TBS}$ remains unchanged until the 4 s are reached again and ramping down starts.

The invention claimed is:

1. A control system for controlling operation of a trailer brake system associated with an agricultural vehicle-trailer combination, the control system comprising a vehicle control unit, and being configured to:
   determine a driver deceleration demand;
   determine at least one pressure peak parameter selected from the group consisting of a pressure level and a duration for a preliminary pressure peak to be provided in at least one fluid line of the trailer brake system in dependence on the driver deceleration demand, wherein the at least one pressure peak parameter is dependent on a drive lever used by a driver to provide a deceleration input to the driver deceleration demand, wherein the at least one pressure peak parameter is dependent on an acceleration rate input associated with at least one of a position of the drive lever and a motion of the drive lever, wherein the acceleration rate input is associated with a status parameter corresponding to differing magnitudes of acceleration or deceleration demanded by the driver, and wherein the at least one pressure peak parameter is determined in dependence on the status parameter;
   generate a trailer brake signal for controlling the trailer brake system in accordance with the at least one pressure peak parameter; and
   forward the trailer brake signal to the trailer brake control system to control operation thereof.

2. The control system of claim 1, further configured to generate the trailer brake signal for controlling the trailer brake system in accordance with the at least one pressure peak parameter at a beginning of an operating cycle of the trailer brake system.

3. The control system of claim 1, wherein the control system is configured to set the pressure level of the at least one pressure peak parameter at a predetermined level for all acceleration rate inputs.

4. The control system of claim 1, wherein the control system is configured to increase the duration of the at least one pressure peak parameter with increasing magnitudes of deceleration as determined from the acceleration rate input.

5. The control system of claim 1, wherein the control system is configured to determine the pressure level of the preliminary pressure peak in dependence on a second correction factor determined in dependence on at least one of a pilot pressure and a comparison of the current pressure level with a threshold pressure value.

6. The control system of claim 1, wherein the control system is configured to determine the pressure level if the preliminary pressure peak in dependence on whether the brake interval is determined to be a first brake interval or a subsequent brake interval as determined by a reset status of the control system.

7. The control system of claim 1, wherein the trailer brake system comprises a hydraulic brake system and the control system is configured to control an oil pressure for at least one fluid line of the hydraulic brake system.

8. The control system of claim 1, wherein the trailer brake system comprises a pneumatic brake system and the control system is configured to control a gas pressure for at least one gas line of the pneumatic brake system.

9. The control system of claim 1, configured to determine a coupling force associated with the coupling between the vehicle and the trailer in dependence on a measure of an operating parameter of a transmission of the vehicle-trailer combination.

10. A braking system comprising the control system of claim 1.

11. An agricultural vehicle coupleable to a trailer to form a vehicle-trailer combination, and comprising the control system of claim 1.

* * * * *